Sept. 21, 1948.  J. J. HENNESSY  2,449,895
RAILWAY JOURNAL BEARING
Filed Oct. 20, 1945

INVENTOR.
JAMES J. HENNESSY
BY *Rodney Bedell*
ATTORNEY.

Patented Sept. 21, 1948

2,449,895

UNITED STATES PATENT OFFICE 2,449,895

RAILWAY JOURNAL BEARING

James J. Hennessy, Montclair, N. J.

Application October 20, 1945, Serial No. 623,529

6 Claims. (Cl. 308—79.1)

1

The invention, relates to the lubrication of railway axle journals, and more particularly to locomotive driver axle journals equipped with a cellar beneath the journal and with a mechanical device for pumping lubricant from the cellar to the journal. The invention relates to improvements in the bearing construction disclosed in my Patent No. 2,293,295, issued August 18, 1942.

Mechanical lubricators of the class described may comprise a pump actuated by the play of the axle back and forth in the journal box and usually such a pump is arranged to feed an adequate supply of lubricant to the journal under unfavorable conditions, such as low temperatures, slow movement of the locomotive, close fit of the axle box to the wheel hub with resulting relatively small play of the axle back and forth in the journal box. Hence, when the conditions are more favorable for pumping lubricant to the journal, as in warm weather and when there is greater play between the parts, there will be an excess amount of lubricant supplied and the excess lubricant tends to travel longitudinally of the journal beyond the bearing and to escape from the box and be lost. To overcome this difficulty, bearings have been constructed whereby a maximum amount of surplus lubricant was trapped and returned to the lubricant cellar without first lubricating adjacent faces of the wheel hub and axle box. To lubricate adjacent faces of the wheel hub and axle box, passages were formed leading from the journal bearing at points in contact with the journal to the outer face of the axle box and subject to the pressure between the bearing and journal. With this arrangement, lubricant under pressure was forced through the passages and the flow of lubricant to the wheel hub was excessive and much was lost.

The object of the present invention is to control the quantity of lubricant supplied to the wheel hubs and adjacent faces of the axle boxes. More specifically, lubricant flow is controlled by providing a passage to the outer face of each axle box from an area of the bearing surface where lubricant is relieved from journal pressure, and the quantity of lubricant flow is determined by the angular position of the passage relative to the bearing face.

This and other detailed objects of the invention are attained by the structure illustrated in the accompanying drawings in which—

Figure 1 is an enlarged detailed isometric view of adjacent portions of a driver box, bearing, cellar, and associated elements, the box and bearing being sectioned horizontally to more clearly illustrate the construction.

2

Figure 1:
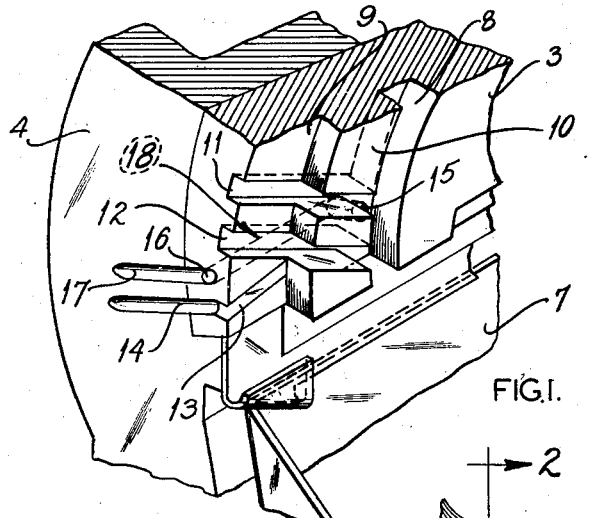
Figures 2, 3:
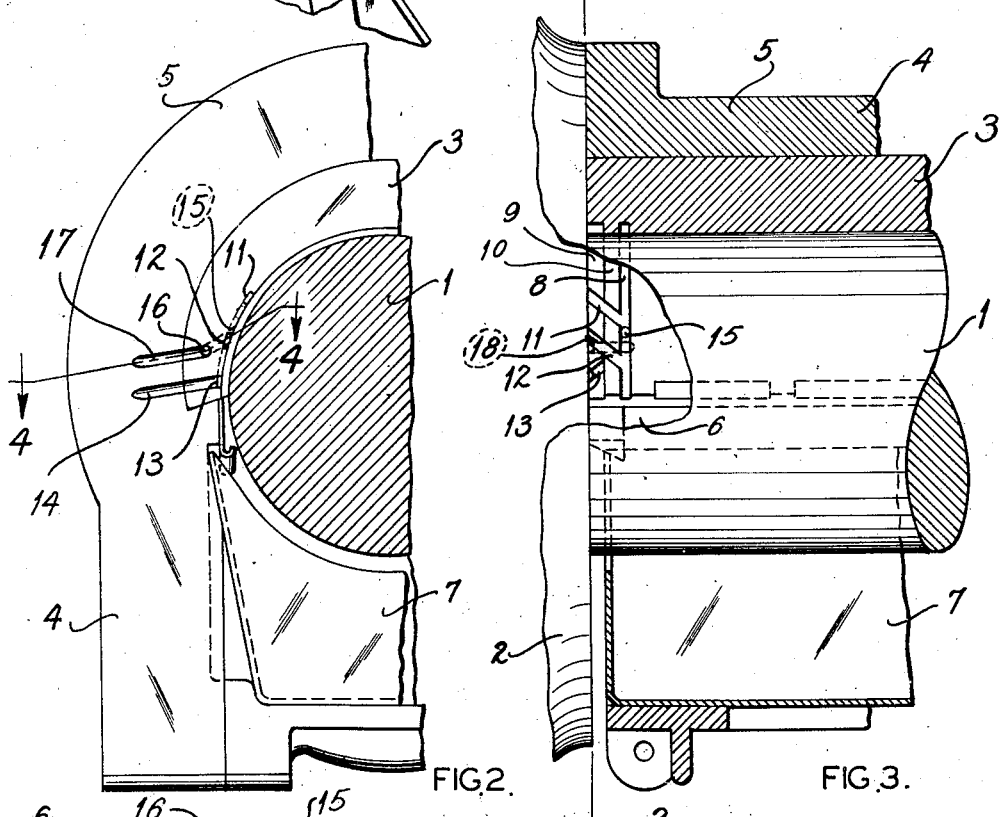
Figure 2 is an end view of the bearing, box, and cellar with the journal sectioned. the line of view being taken approximately on the line 2—2 of Figure 3. The bearing, box, and cellar are substantially symmetrical about a vertical plane through the center of the journal.
Figure 3 is a vertical longitudinal section through a restricted portion of a locomotive axle box and bearing showing the journal and adjacent portion of the wheel hub.
Figure 4:
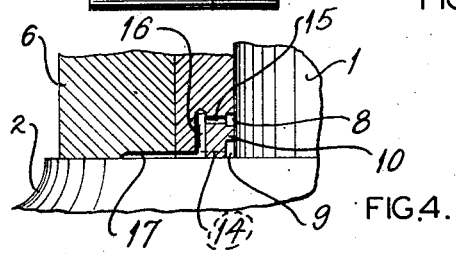
Figure 4 is a section taken approximately on line 4—4 of Figure 2 and shows the lubricant passage leading from the bearing to the outer face thereof adjacent the wheel hub.

A journal 1 mounting a driving wheel, the hub of which is shown at 2, rotates in journal bearing 3 which fits around the upper portion of the journal and is seated in axle box 4 having the top wall 5 and side walls 6 recessed to receive the bearing. At the lower portion of axle box 4 is a lubricant cellar 7 for lubricant supplied to journal 1 and bearing 3 by a pump and distributor or by other means (not shown). Near the outer end of bearing 3 adjacent wheel hub 2 is a circumferential recess 8 extending from one lower edge of the bearing to the other to trap excess lubricant and to relieve lubricant of pressure exerted thereon by rotation of the bearing in the journal. A second recess 9 extending also from one lower edge of the bearing to the other about the inner periphery of the bearing is spaced outwardly from recess 8 and cooperates therewith to form a rib 10.

Near each lower forward end of the bearing, rib 10 and the peripheral face of recess 9 are grooved to provide parallel downwardly and inwardly extending channels 11 and 12, the inner ends of which merge with recess 8. The peripheral face of recess 9 is grooved also at each lower forward end to provide a downwardly and outwardly extending channel 13, the outer end of which merges with a slot 14 on the outer face of the bearing and axle box adjacent the wheel hub to facilitate distribution of lubricant thereto.

Near each end of the peripheral face of recess 8, a hole 15 is drilled at an angle of approximately 30° to the horizontal. A slot 17 is formed in the outer face of the bearing and box. Another hole 16 is drilled from slot 17 substantially parallel to the longitudinal axis of the journal and perpendicular to hole 15 and intersects the latter to form a passage 18 from recess 8, an area of reduced pressure, to the outer face of the axle box adjacent the wheel hub.

Lubricant flows from the interior of the bearing through passage 18 to the outer face of the bearing and the quantity of lubricant flowing through passage 18 is determined by the angle of hole 15 with the bearing face, the smaller the angle, the greater the quantity of lubricant flowing through the hole because of the added force of gravity on the steeper slope and elongation of the entrance to the hole 15 at the bearing surface into which lubricant drains more freely.

Lubricant supplied from the cellar to the journal in the conventional manner spreads outwardly along the journal toward recess 8 and some of the lubricant is trapped therein. However, some lubricant passes rib 10 and is trapped in recess 9 where it flows to the lower part thereof. Some lubricant passes in grooves 11 and 12 back to recess 8. Lubricant reaching groove 13 passes outwardly to slot 14 in the outer bearing face and is distributed to adjacent faces of the wheel hub and axle box. Any lubricant below groove 13 returns to lubricant cellar 7.

As lubricant flows past hole 15, some lubricant flows into passage 18 under the force of gravity to slot 17 on the outer face of axle box 4 and is distributed thereby to the adjacent face of the wheel hub. To insure an adequate supply of lubricant at all times to the wheel hub, hole 15 is preferably drilled approximately at or below the junction of groove 11 with recess 8 so that a portion of lubricant trapped in recess 9 flows over the hole via groove 11. Any lubricant reaching the lower part of recess 8 below hole 15 returns to lubricant cellar 7 to be used again.

Pressure of the lubricant is relieved in all depressed areas not engaging the journal, as in recesses 8 and 9, in grooves 11, 12, and 13, in passage 18, and in slots 14 and 17.

A bearing of the kind described provides adequate though not excessive lubrication to the outer faces of the axle box and wheel hubs, and the quantity of lubricant supplied to the outer face can be controlled by changing the angular position of hole 15 relative to the bearing face resulting in an elongated or shortened opening in the direct path of oil flow through recess 8 to increase or decrease the quantity of lubricant to the wheel hub. Also by changing the angle between the hole axis and the bearing face, the angle of slope of the hole is greater or less causing increased or decreased oil flow under the force of gravity.

While some of the elements of this combination may be used irrespective of whether all of the other elements are present, it is preferable to retain all of these elements to assure adequate and economical lubrication, and I contemplate exclusive use of the described parts, separately or together, or any modifications of the same which come within the scope of the appended claims. For example, in some instances it may be desirable to recess the journal to form an area of reduced pressure, and this area can be connected by a passage to the outer face of the bearing.

What is claimed is:

1. A railway axle journal bearing with a journal engaging face having a circumferential groove positioned to trap lubricant as it moves towards the end of the bearing and providing an area free of engagement with the journal to which it is applied whereby lubricant in this area between the bearing and the journal will be relieved of pressure, and a passage extending downwardly from said area and to the end of the bearing to lubricate said end.

2. A railway axle journal bearing as described in claim 1 in which the passage slopes downwardly from said face at approximately 30° from a horizontal plane.

3. A railway axle journal bearing with an outer wheel hub engaging face and a semi-cylindrical downwardly presented concave journal engaging face provided near one end with a circumferential recess whereby lubricant between the bearing and a journal to which it is applied will be trapped and relieved of pressure as it moves longitudinally of the bearing and reaches the recess, and a downwardly and outwardly sloping passage in the peripheral face of said recess connecting said recess to the outer face of the bearing.

4. A railway axle journal bearing with an outer wheel hub engaging face and a semi-cylindrical downwardly presented concave journal engaging face provided near one end with a peripheral recess whereby lubricant between the bearing and a journal to which it is applied will be relieved of pressure as it moves longitudinally of the bearing and reaches the recess, a passage sloping downwardly from the peripheral face of said recess into said bearing and connecting said recess to the outer face of the bearing, a second peripheral recess separated from the first recess by a rib, a groove in the peripheral face of said second recess sloping downwardly and outwardly to the outer face of the bearing, a portion of said rib being cut away to permit excess lubricant to flow from the second mentioned recess to the first mentioned recess.

5. A railway axle journal bearing with an outer wheel hub engaging face and a semi-cylindrical downwardly presented concave journal engaging face provided near one end with a recess whereby lubricant between the bearing and a journal to which it is applied will be relieved of pressure as it moves longitudinally of the bearing and reaches the recess, a second peripheral recess adjacent the end of the bearing and spaced from the first recess by a rib, a groove in the peripheral face of said second mentioned recess sloping downwardly thru said rib to said first mentioned recess and connecting said recesses, a passage having an opening in the peripheral face of the first mentioned recess located approximately at the junction of the groove and the recess and connecting the recess to the outer face of the bearing.

6. A railway axle journal bearing with an outer wheel hub engaging face and a semi-cylindrical downwardly presented concave journal engaging face provided near one end with a circumferential recess whereby lubricant between the bearing and a journal to which it is applied will be relieved of pressure as it moves longitudinally of the bearing and reaches the recess, said bearing having a hole sloping downwardly from the circumferential face of said recess into said bearing, a second hole in the outer face of the bearing substantially parallel to the longitudinal axis thereof and extending to said first mentioned hole to form a passage from an area in the bearing where pressure of the lubricant is relieved to the outer face of the bearing.

JAS. J. HENNESSY.

REFERENCES CITED

The following references are of record in the file of this patent:

UNITED STATES PATENTS

| Number | Name | Date |
|---|---|---|
| 1,915,409 | Davis | June 27, 1933 |
| 2,293,295 | Hennessy | Aug. 18, 1942 |